United States Patent [19]

Manganaro

[11] 4,033,500

[45] July 5, 1977

[54] ELECTROMAGNETIC STAPLER AND SAFETY TRIGGER THEREFOR

[75] Inventor: George Frank Manganaro, Garfield, N.J.

[73] Assignee: Electro-Matic Staplers, Inc., Saddle Brook, N.J.

[22] Filed: Mar. 26, 1976

[21] Appl. No.: 670,649

[52] U.S. Cl. .................................. 227/131; 310/34
[51] Int. Cl.² ......................................... B25C 5/06
[58] Field of Search ............. 227/131; 200/61.58 R, 200/61.58 B, 160; 310/14, 15, 34, 35, 50; 318/125

[56] References Cited

UNITED STATES PATENTS

| 3,209,180 | 9/1965 | Doyle | 227/131 |
| 3,347,438 | 10/1967 | Doherty | 227/131 |
| 3,786,286 | 1/1974 | Palsson et al. | 227/131 |
| 3,786,978 | 1/1974 | Manganaro | 227/131 |

FOREIGN PATENTS OR APPLICATIONS 1,290,830  3/1962  France .............................. 227/131

Primary Examiner—Granville Y. Custer, Jr.
Attorney, Agent, or Firm—Marvin Feldman; Stephen E. Feldman

[57] ABSTRACT

An electromagnetic stapler having a staple driving circuit with an actuating switch, and having a levered trigger which is depressed by the user so that the lever actuates the switch, whereinafter actuation, a moving element of staple driving mechanism strikes the lever causing disengagement of the lever from the switch so that only one shot is permissible unless and until the trigger is again depressed. The trigger is useful in mechanically providing a safety one shot control for a conventional stapler having a continuous repetitive electrical driving circuit, and the trigger is readily mounted with a conventional stapler. A stapler may alternatively house a trigger permitting a continuous repetitive staple drive, or the trigger of the present invention which provides a one shot staple drive.

10 Claims, 6 Drawing Figures

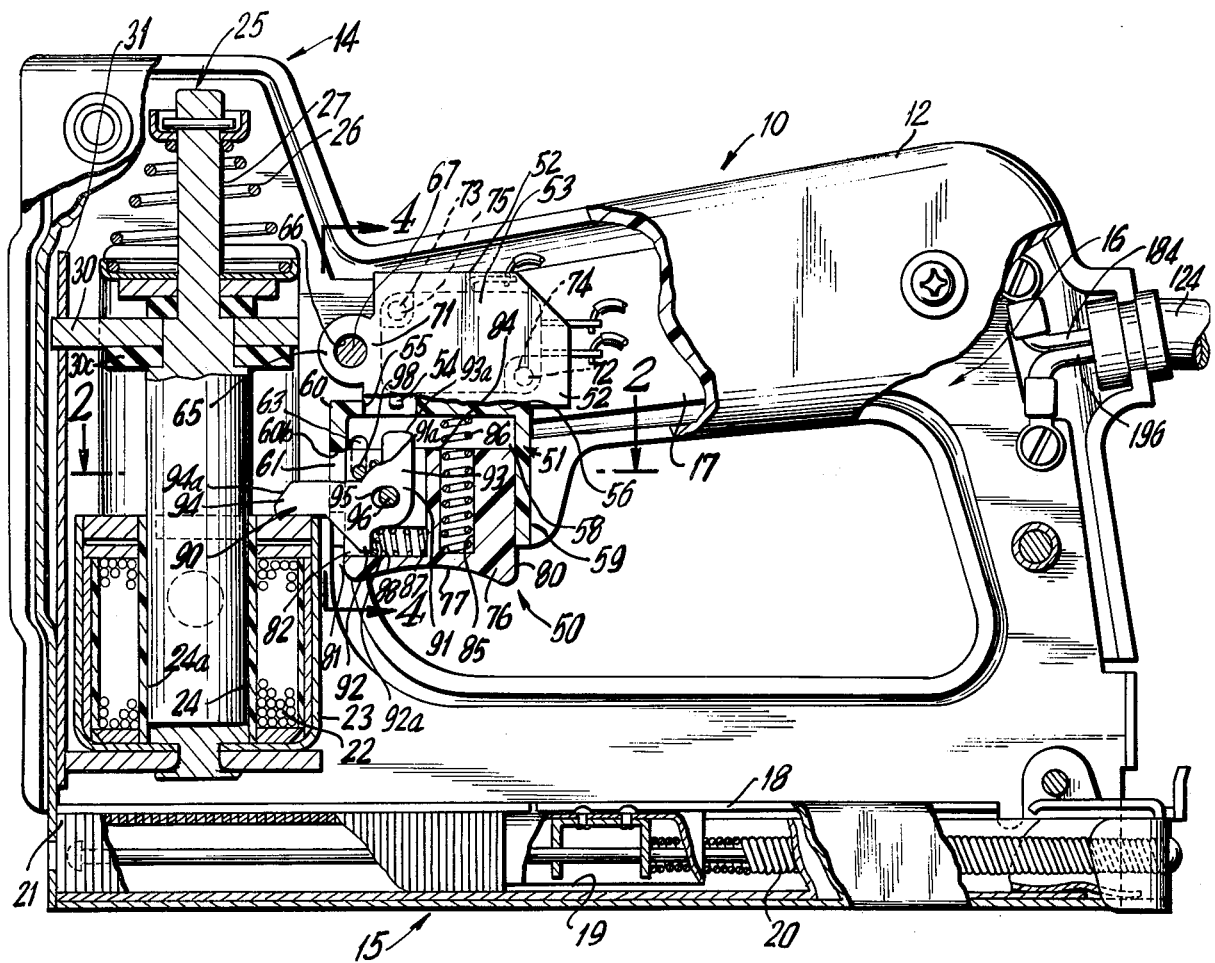
FIG. 1
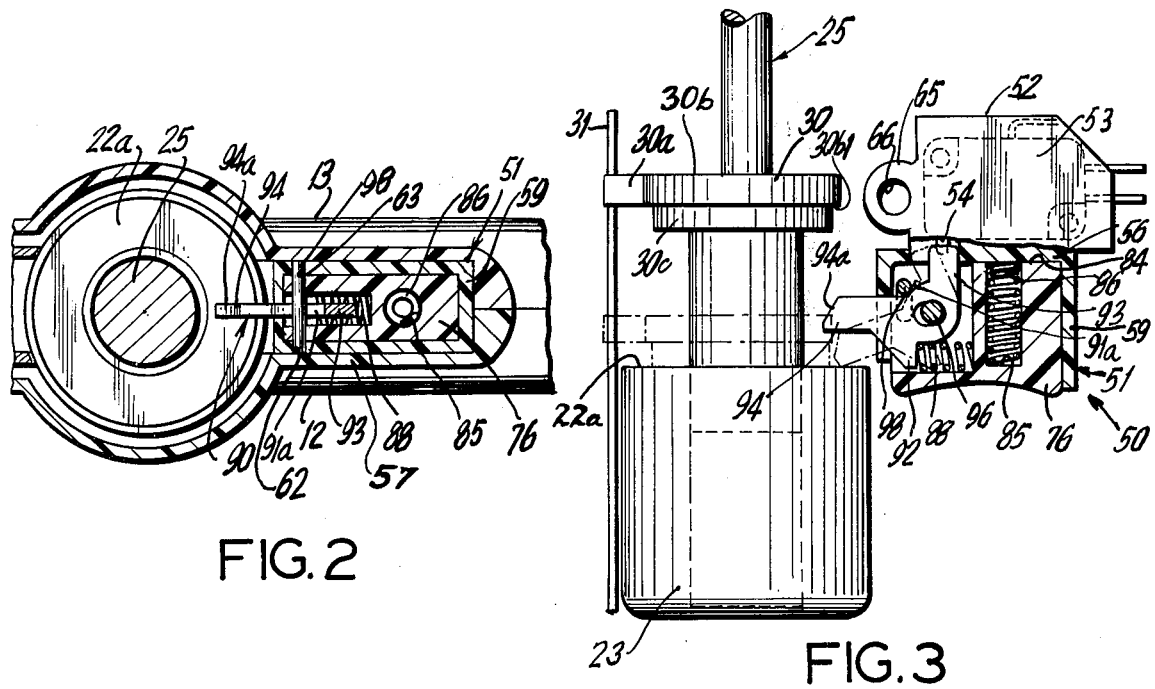
FIG. 2
FIG. 3

ELECTROMAGNETIC STAPLER AND SAFETY TRIGGER THEREFOR

This invention relates to electromagnetic staplers. Specifically this invention relates to a trigger for actuating the switch of an electromagnetic stapler. More specifically, this invention relates to a trigger for providing a single shot control in an electromagnetic stapler.

In Manganaro, U.S. Pat. No. 3,786,978 granted Jan. 22, 1974, there is disclosed an electromagnetic stapler wherein where the trigger is held in an actuated condition for a predetermined period, the operation of the stapler is repeated, provided that a work engaging leg is in contact with the work piece, and operation of the stapler is prevented when the leg is disengaged from the workpiece. While this stapler achieved its intended purpose, the addition of the work engaging leg was unwiedly in certain applications and a relatively costly adjunct.

In Doyle et al, U.S. Pat. No. 3,267,337, granted Aug. 16, 1966, there is disclosed a fastener driving tool having a conventional trigger and having a circuit designed to drive the staple only during a selected cycle. Such circuits were often necessarily complex in design and therefore costly, and further the fastener operation was limited to the specific characteristics of the particular circuit.

Now there is provided by the present invention a positive acting mechanical trigger for ensuring a single shot staple action with electromagnetic staplers having continuous repetitive drive circuits, and wherein the trigger is readily mounted in conventional stapler trigger housings.

It is therefore an object of this invention to provide a trigger for an electromagnetic stapler which when depressed actuates a switch to drive a staple and whereupon the staple driving action mechanically disengages the switch to disconnect the circuit.

It is another object of this invention to provide a trigger for an electromagnetic stapler having a continuous repetitive driving circuit wherein the trigger permits only a single shot.

It is a further object of this invention to provide a trigger as aforesaid wherein the trigger is readily mounted in conventional trigger housings.

It is still a further object of this invention to provide a trigger for an electromagnetic stapler having a continuous repetitive driving circuit, wherein there is only a single shot with the trigger depressed and whereupon release of the trigger another single shot is achieved with the next trigger depression.

It is another object of this invention to provide an electromagnetic stapler having a trigger which when depressed actuates a switch to drive a staple and whereupon the staple during action mechanically disengages the switch to disconnect the circuit.

It is another object of this invention to provide an electromagnetic stapler having a trigger as aforesaid wherein the trigger is readily mounted in conventional trigger housings.

It is another object of this invention to provide an electromagnetic stapler having a trigger, said electromagnetic stapler having a continuous repetitive driving circuit, wherein there is only a single shot with the trigger depressed and whereupon release of the trigger another single shot is achieved with the next trigger depression.

A further object of this invention is to provide a strong and durable electromagnetic stapler of the character described which shall be positive in operation and which shall yet be practical, safe and efficient to a high degree in use.

Other objects of this invention will in part be obvious, and in part hereinafter be pointed out.

This invention accordingly consists in the features of construction, combinations of elements, and arrangement of parts which will be exemplified in the construction hereinafter described, and of which the scope of invention will be indicated in the following claims.

IN THE DRAWINGS

FIG. 1 is a side elevational view of an electromagnetic stapler embodying the invention, with partial broken and sectional views;

FIG. 2 is a sectional view taken along line 2—2 of FIG. 1;

FIG. 3 is a side elevational view of the trigger of this invention is combination with the armature wherein the trigger is depicted in solid line as engaging a switch, and in broken line as being disengaged from the switch;

Figure 4:
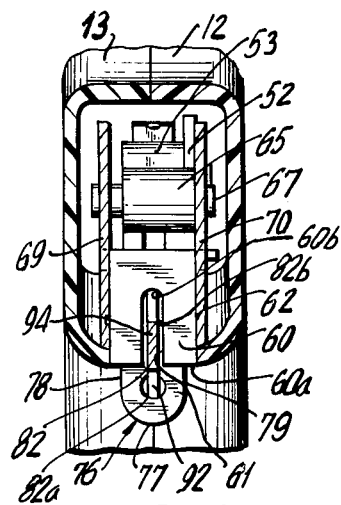
FIG. 4 is a sectional view taken along line 4—4 of FIG. 1.

Referring now to FIG. 1, there is shown an electromagnetic stapler generally designated as 10 having a trigger 50 embodying the invention. The stapler 10, except, principally for trigger 50, and other aspects as will be pointed out hereinafter, may be similar in design and construction to the stapler described and shown in U.S. Pat. No. 3,786,978, granted Jan. 22, 1974.

Generally stapler 10 comprises two symmetrical frame members 12 and 13 housing a staple drive assembly 14, a staple magazine or feed assembly 15, electrical drive circuit 16, a switch 53 and trigger 50.

Staple magazine assembly 15 is of the well known construction and generally comprises a housing 18, a staple guide 19, spring loaded feed means 20 and staples 21.

Staple drive assembly 14 comprises an electromagnetic coil 22, coil housing or cup 23, wherein the housing 23 has a central cylindrical member 24 forming hole 24a, and an armature 25. Armature 25 is received in cup 23 when coil 22 is energized. Spring 26 is mounted on armature hub 27 so as to return the armature to the position of FIG. 1 after coil 22 is deenergized, all of the above being in the well known manner.

Cylindrical flange 30 is fixedly mounted on armature 25 at an intermediate portion thereof and flange portion 30a extends forwardly for mounting staple driving blade 31, so that with the lowering of armature 25 into cup 23, blade 31 is driven downwardly to in turn drive a staple 21 into a workpiece (not shown).

Referring to FIGS. 1 and 3, specifically as to the present embodiment, flange 30 is formed with an upper metal portion 30b and a lesser diameter lower non-metallic flange or bumper 30c; the upper portion extending forwardly so as to form portion 30a. When the armature is in its lowermost position in cup 23, bumper 30c abuts top portion 22a and edge 30bl of portion 30b is disposed above the top portion 22a of cup 23. A lever 90 of trigger 50 is disposed in the path of flange portion 30b or more specifically edge 30bl in moving from the upper or rest position to the lower or drive position, so as to be engaged by the flange, as will be more fully explained hereinafter.

Referring now to FIGS. 1-4, there is specifically shown the trigger 50 of the present invention. Trigger 50 comprises a plastic housing 51 with an upright flange portion 52 onto which is mounted micro-switch 53. Microswitch 53 is provided with a switch actuating button 54 which projects downwardly through hole 55 of transverse wall 56 of housing 51. Hole 55 is oversized for purposes hereinafter appearing.

Housing 51 further comprises a pair of opposed side walls 57 and 58, flange 52 extending upwardly from wall 57, and a pair of opposed end walls 59 and 60. End wall 60 is formed with a vertical slot 61 extending from the bottom edge 60a of wall 60 to intermediate point 60b. Side walls 57 and 58 are each formed with coincident vertically disposed slots 62 and 63, respectively.

Housing 51 further comprises a cylindrical transverse portion 65 being formed with a through hole 66. The through hole 66 is for receiving a bolt 67 so as to fixedly hold the trigger assembly between internal metal frame members 69 and 70. Cylindrical portion 65 has a flat vertical wall 71, which is rectilinear and contiguous to the top of wall 56 so as to form a seat for switch 53. Flange 52 is also formed with projections 72 and 73 which insert into holes 74 and 75 respectively of the switch. In the aforesaid manner, switch 53 is secured to trigger 50, with accurate positioning of switch button 54 in the trigger housing.

Trigger 50 further comprises member 76 which comprises a bottom wall 77 formed to receive the index finger of the user, a pair of opposed side walls 78 and 79 slidably engaging the inside of housing side walls 57 and 58, respectively, and a pair of opposed end walls 80 and 81 slidably engaging housing end walls 59 and 60, respectively. End wall 81 is formed with a vertically disposed slot 82 having a lower circular portion 82a, and a contiguous upper elongated portion 82b. Member slot portion 82b is approximately coincident with housing slot 61. A member top wall 84 is parallel to housing top wall 56.

Member 76 is also formed with a vertical cylindrical recess 85 for receiving compression spring 86 which is disposed between the member 76 and housing wall 56, and a horizontal part-cylindrical recess 87 for receiving compression spring 88 which is disposed between member 76 and a lever 90.

Lever 90 is housed in part within member 76. Lever 90 comprises a hub 91, a first arm 92 being formed with a flat edge 92a for abutting spring 88, a second arm 93 being formed with an upper edge 93a for engaging switch button 54, and a third arm 94 extending outwardly from the trigger housing and being formed with an angular edge 94a for engaging edge 30bl of the armature flange. All of the arms 92, 93 and 94 emanate from hub 91, and hub 91 is formed with an oversized hole 95 for receiving member pin 96, whereby lever 90 is rotatable about pin 96. Further lever 90 is slidable in housing 51, by the movement of member 76 which is principally transmitted by pin 96 acting on the hub portion 91.

A stop pin 98 is fixedly mounted in and transversely disposed to member 76 and extends into slots 62 and 63, so that in its lowermost or rest position engages the bottom of said slots and in its uppermost position engages the top of said slots so as to limit the upward travel of member 76 in housing 51. Stop pin 98 also engages hub portion 91a so as to provide a bearing surface for lever 90 as lever 90 rotates about pin 96 (FIG. 3).

Figure 6:
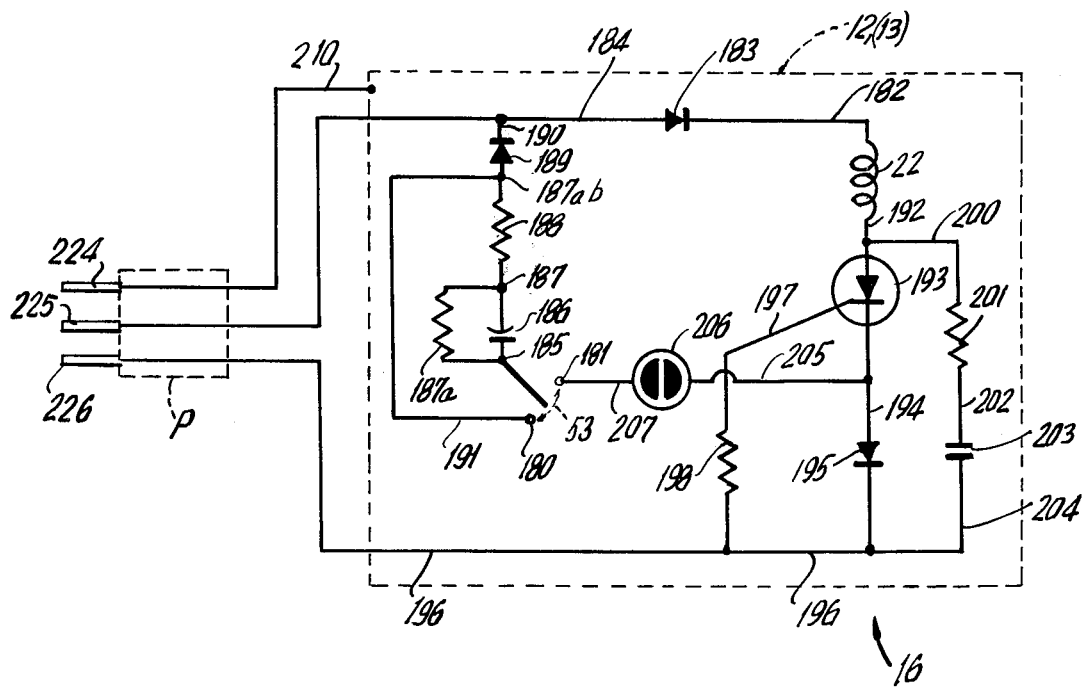
FIG. 6 is a schematic illustration of the circuit for driving the staple.

Referring to FIG. 6 there is shown the schematic of the continuous repetitive circuit which is similar to the circuit as shown in FIG. 10 of U.S. Pat. 3,589,587.

One side of said load coil 22 is connected by wire 182 to a rectifier anode 183 which is connected by wire 184 to a plug P. Switch 53 is connected by wire 185 to a capacitor 186 which is connected by wire 187 to one side of a resistor 188. The other side of the resistor 188 is connected to rectifier 189, by a wire 187ab. Rectifier or diode 189 is connected by wire 190 to said wire 184. Contact 180 is connected by wire 191 to a wire 187ab. The other side of load coil 22 is connected by wire 192 to the anode side of a gated silicon rectifier or SCR 193. The cathode side of said SCR 193 is connected by wire 194 to one side of a rectifier or diode 195. The other side of rectifier or diode 195 is connected to wire 196. Resistor 198 is connected to diode 195 in parallel circuit. Connected to wire 192, is a wire 200 connected in turn to one side of a resistor 201. The other side of resistor 201 is connected by wire 202 to one side of a capacitor 203. The other side of capacitor 203 is connected by wire 204 to wire 196. Wire 194 is connected by wire 205 to a neon lamp 206. Said lamp 206 is connected by wire 207 to contact 181. Wire 185 is connected to wire 187 by resistor 187a, so that resistor 187a and capacitor 186 are in parallel circuit.

The plug is connected by ground wire 210 to the body member 12, 13. The wires 210, 184, 196 passing from plug P to the tool comprise the line cord or cable 124. The plug has blades 224, 225, 226 connected to wires 210, 184 and 196, respectively.

The components of the circuit other than the load coil 22, the trigger switch 53 and contacts 180, 181 are mounted in any suitable manner on the insulating plate 17.

In operation, the user grips the staple so that the index finger engages member 76, and depresses member 76 so that member walls 78, 79, 80 and 81 slide in trigger housing walls 57, 58, 59 and 60, respectively. With the depression of member 76, spring 86 undergoes compression in recess 85. Further the upward movement of member 76 into housing 51, causes pin 96 to in turn move lever 90 upwardly, so that arm 94 slides in housing slot 61, and edge 93a of arm 93 engages switch button 54. With the full depression of member 76, wherein stop pin 98 abuts the top edge of slots 62 and 63, switch button 54 is depressed. Pin 98 is wedged between the top of slots 62, 63 and lever hub bearing surface 91a.

With switch 53 closed, the switch is moved from contact 180, wherein capacitor 203 has been charged, to contact 181 wherein capacitor 186 draws current and activates SCR 193 during the negative cycle of alternating current from an outlet to which the plug P is connected. If the switch should close during a positive half cycle of the supply, rectifier or diode 189 prevents flow of current until the line reverses polarity. With the line negative, gate current flows from the line through the SCR 193 gate, switch 23, resistor 188 and rectifier or diode 189 to charge capacitor 186. Current takes this path because diode 195 prevents current flow directly from the line in the reverse direction to the switch. SCR 193 will trigger as soon as gate current flows because the SCR's diode is always forwardly biased by previously charged capacitor 203. With SCR 193 gated on, the discharge time constant of the resistor 201, capacitor 203 network and SCR 193 is long enough to maintain SCR 193 in conduction until the line once more reverses polarity. However, SCR 193 does not conduct until the line turns positive. When line turns positive the neon lamp 206, fires, discharging the capacitor 203 thereby causing the SCR 193 to conduct.

The SCR 193 turns off when the line turns negative again. SCR 193 can only conduct when the capacitor 186 draws current. The delay period between pulses depends on the value of resistor 187a which acts as a bleeder resistor across capacitor 186. The larger the value of said resistor 187a, the slower the frequency of the pulse.

The time delay of this repeat pulse is important insofar as it is greater than the time to disengage lever arm 93 from the switch button 54 so as to disconnect switch 53 before the next charging pulse is sufficient to repeat the staple driving action.

With the single shot staple driving action, coil 22 is energized so that armature 25 is rapidly received in cup 23. In its downward travel edge 30bl of armature flange 30b strikes edge 94a of lever arm 94 so that lever 90 is caused to pivot about pin 96 with hub edge 91a guided against pin 98. With this pivoting action arm 93 moves in hole 55 and disengages from switch button 54. Switch button 54 being spring-loaded then projects downwardly in the open position causing switch 53 to be disconnected (FIG. 3) so that contact 181 is open. Of course this switch disconnection occurs during the staple driving action before the next charging pulse is sufficiently developed so that only the single shot is possible.

The stapler will thus not repeat the stapler driving action unless and until the trigger is released and again depressed.

When depressed member 76 is released, spring 86 is expanded to return 76 to its initial rest position of FIG. 1 and simultaneously, compressed spring 88 expands to return pivot lever 90 to its initial rest position of FIG. 1. Stop pin 98 returns to its lowermost position as well.

The stapler is ready for the next actuation by the user.

Figure 5:
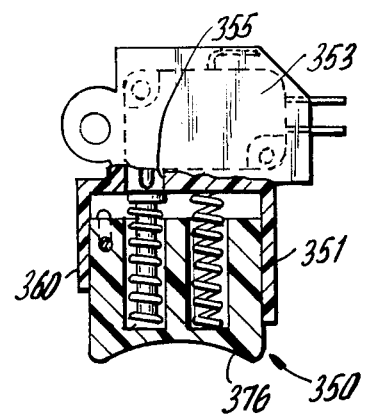
FIG. 5 is a partial sectional view of conventional trigger with a switch mounted thereon.

Referring now to FIG. 5, there is shown a trigger 350 which is similar to that of U.S. Pat. NO. 3,786,978 with a switch 353 similar to switch 53 heretofore-described. The housing 351 of trigger 350 is of the same overall dimension and configuration as that of housing 51, expect there is no slot similar to slot 61 in wall 360, and hole 355 is considerably undersized compared with hole 55 of the present preferred embodiment. Of course depressable member 376 is distinctly different from member 76. However insofar as the overall housing configurations of triggers 350 and 50 are quite similar each may be alternatively employed in the same electromagnetic stapler. With trigger 350 inserted in the staples there is a continuous repetitive staple action with member 376 depressed (absent an adjunct device to prevent same), and with trigger 50 inserted there is a single shot action with member 76 depressed.

From the foregoing it will be seen that this invention is one well adapted to attain all of the ends and objects hereinabove set forth, together with other advantages which are obvious and which are inherent in the device.

As many possible embodiments may be made of the invention without departing from the scope thereof, it is to be understood that all matter herein set forth or shown in the accompanying claims is to be interpreted as illustrative and not in a limiting sense.

What is claimed is:

1. A staple driving tool comprising a body, a load coil in said body, said coil having an opening, armature means disposed in said body and slidable in said opening for movement by said coil when the coil is energized, staple driving means fixed to said armature means and disposed at the front of the body, a staple magazine at the lower end of said body, a switch on said body, control circuit means interconnecting line current supply to said coil and switch, said control circuit means comprising means to energize said coil to a charge so that said staple driving action is at the desired force, and further comprising time delay pulse means so that the time delay pulse between shots is greater than the time to disengage the switch, a trigger, said trigger comprising a housing, a trigger member slidably engaging said housing and being depressable by the user in relation to the housing, motion responsive means adjacent said trigger to transmit the depressing motion to actuate the switch for completing the control circuit means, said motion responsive means being movably mounted to said housing whereby upon movement of said armature means, said armature means strikes said motion responsive means so as to disengage said motion responsive means from said switch while said trigger is in the depressed condition, whereby depression of said trigger actuates said switch causing the staple driving action only at the desired force and whereupon disengagement of the switch by the staple driving action, the switch opens the control circuit means so as not to energize the coil until the trigger is again depressed.

2. The staple driving tool of claim 1, said motion responsive means comprising a lever and means to pivotally, slidably mount said lever to said trigger.

3. The staple driving tool of claim 2, said lever being formed with a first arm for engaging said trigger, a second arm for contactingly actuating said switch, and a third arm extending away from said housing and having a portion thereof engageable by a moving element connected to said armature means, whereby on engagement with said element said lever is caused to pivot so that said second arm is pivotally disengaged from the switch, while the trigger remains depressed.

4. The staple driving tool of claim 3, said armature means having a flange mounted thereon above said coil said flange comprising said element and said third arm of the lever being disposed between the flange and the coil.

5. The staple driving tool of claim 4, said third arm portion being angularly disposed to said flange so as to be struck by said flange in the staple driving action.

6. The staple driving tool of claim 3, further comprising a spring contacting the first arm so as to pivot said lever in direction reverse to said first pivoting, with the release of said trigger so that said lever is returned to position to again contactingly actuate the switch with the next depression of said trigger.

7. The staple driving tool of claim 1, further comprising a spring contacting the motion responsive means so as to return the means to position so as to again actuate the switch with the next depression of said trigger.

8. The staple driving tool of claim 2, further comprising a stop member on said trigger housing transversely disposed to said lever so as to be contacted by said lever when said trigger is depressed so as to limit the movement of said sliding lever.

9. The staple drivng tool of claim 8, said stop member being formed with a bearing surface so as to slidably engage a portion of said lever in pivoting during disengagement from said switch.

10. The staple driving tool of claim 2, further comprising a pin fixedly mounted with said trigger housing, and said lever being formed with a hole, said lever being rotatably mounted on said pin, and wherein said hole is oversized in relation to said pin, thereby permitting transverse movement of said lever with relation to said pin.

* * * * *